United States Patent [19]

Marshall

[11] 4,273,252
[45] Jun. 16, 1981

[54] TAPED PRODUCTS PROCESSOR

[75] Inventor: Larry J. Marshall, Menlo Park, Calif.

[73] Assignee: Raychem Corporation, Menlo Park, Calif.

[21] Appl. No.: 931,545

[22] Filed: Aug. 7, 1978

Related U.S. Application Data

[62] Division of Ser. No. 721,700, Sep. 9, 1976, abandoned.

[51] Int. Cl.³ .............................................. B65H 5/28
[52] U.S. Cl. ..................................... 221/13; 198/469; 221/71
[58] Field of Search ............................. 221/13, 70–74; 198/469, 857; 29/714

[56] References Cited

U.S. PATENT DOCUMENTS

| | | | |
|---|---|---|---|
| 2,252,498 | 8/1941 | Flaws | 198/857 X |
| 2,908,909 | 10/1959 | Stolecki et al. | 221/73 X |
| 3,531,016 | 9/1970 | Pray | 221/13 |
| 3,907,099 | 9/1975 | Smith | 198/857 X |
| 3,917,045 | 11/1975 | Williams et al. | 221/71 X |

Primary Examiner—F. J. Bartuska
Attorney, Agent, or Firm—Lyon & Lyon

[57] ABSTRACT

An apparatus is disclosed for processing products aligned on a tape. In the present embodiment, the products are shown to be heat recoverable sleeves which are conveyed to a control station for insertion of a terminal. The work is then released from the control station and allowed to pass across a heater which recovers the sleeve about the terminal. To accomplish the above, a drive having a friction coupling and a positive coupling are employed to convey the work through the apparatus. A conditioned atmosphere process apparatus is employed for the heating of the sleeves and a controlled product feed apparatus controls the feeding of the work to the control station.

2 Claims, 15 Drawing Figures

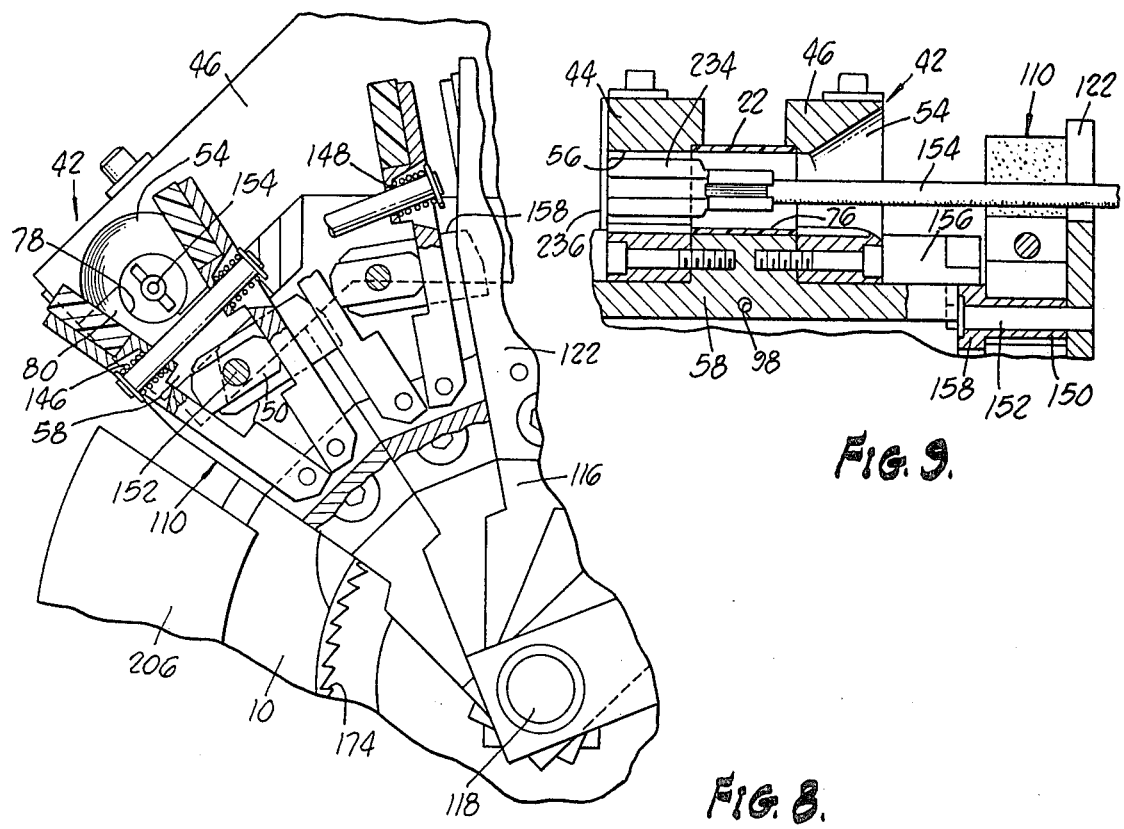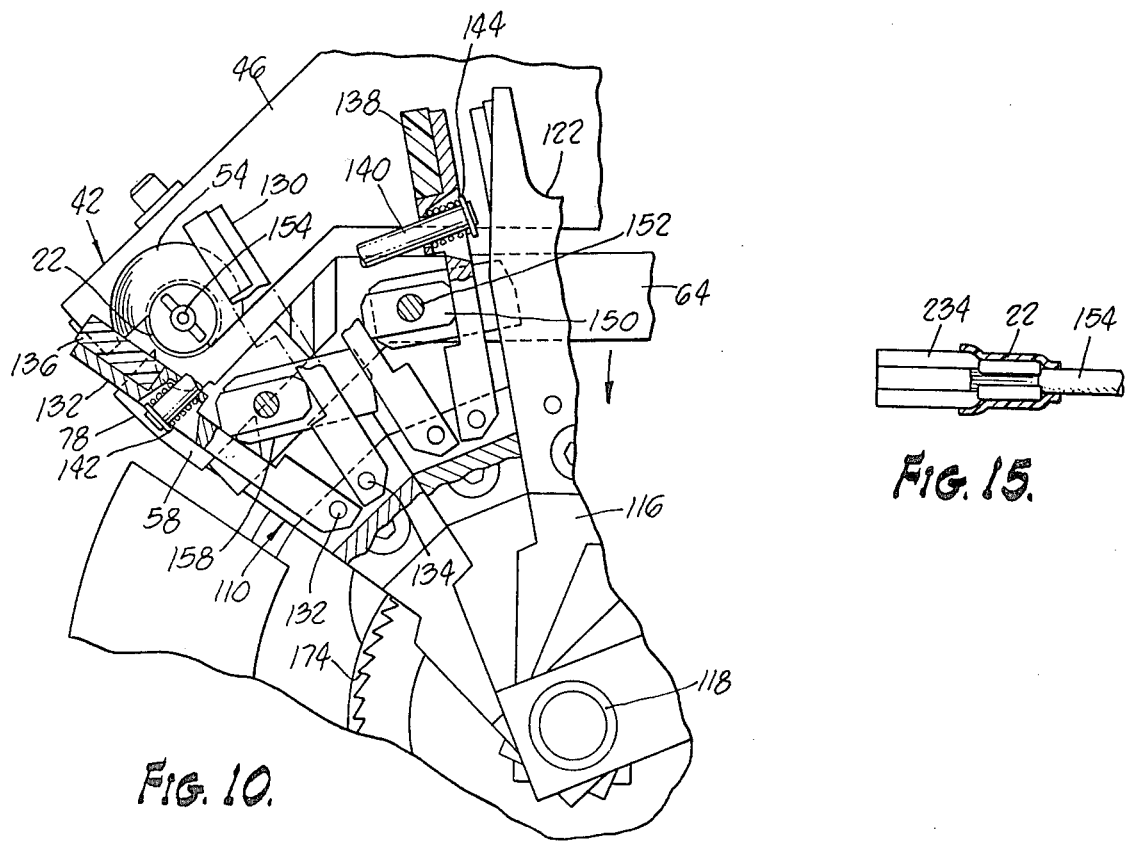

TAPED PRODUCTS PROCESSOR

This is a division of application Ser. No. 721,700, filed Sept. 9, 1976 now abandoned.

BACKGROUND OF THE INVENTION

The present invention is directed to a mechanism for processing taped products. Included with the mechanism are a work drive having a friction coupling and a positive coupling, a conditioned atmosphere process apparatus for directing a conditioned atmosphere to the work passing along a product path therethrough, and a controlled product feed apparatus for feeding work to a control station.

Electrical and electronic equipment have experienced substantial increases in complexity and number of components for some period of time. The total output and the variety of output of such equipment have also been increasing. With civilization's ever increasing need for more and more complex electrical and electronic equipment, certain devices and processes have been developed in an effort to increase production and reduce the cost thereof. This is equally true of the hydraulics and pneumatics industries as well. For example, mass production techniques and standardized components have been employed wherever possible. With the employment of such mass production techniques and products, the unit cost of the final product can often be reduced and the number of products reduced can be increased.

In achieving economic production of electrical, electronic, hydraulic and pneumatic control equipment, it has been found advantageous to provide component parts on a tape by lightly bonding the components to the tape. The tape may then be positioned on a mechanism which can provide components one at a time for assembly. However, a great deal of component manipulation must still be accomplished by hand. Such manual work has been required because of the operator's inability to work at a fixed, unvarying rate and because it is often desirable or necessary to individually match specific lines, leads or other elements with certain components positioned on the tape. Thus, a large number of operations remain which are accomplished manually because of the foregoing problems.

SUMMARY OF THE INVENTION

The present invention is directed to a mechanism for processing products pre-loaded on a tape. By the present apparatus, the taped products may be completely assembled with other components without requiring any manipulation of the taped products by hand. To accomplish this, a controlled product feed apparatus is provided which conveyes taped products into the taped products processor. The feed apparatus detaches the attached components and forces them to a control station following movement of the preceding component from the control station. A detection means for sensing an interrupted path is employed as the means for controlling the feed of the taped components. Thus, taped components are provided only when the operator has completed the previous operation.

A drive having multiple drive couplings is also provided for receiving the work provided at the control station and conveying it at a fixed rate through a processing zone. The drive mechanism has the capacity for conveying a number of assembled components at the same time at the fixed rate through the processing zone while allowing the operator to release each succeeding assembled component from the control station only when work at that station has been completed. The drive includes a friction coupling and a positive coupling along with retractable stops to accomplish the various process requirements.

A conditioned atmosphere process apparatus is also provided in association with the product path through which the assembled components pass following discharge from the control station. In the present embodiment, a heating unit is disclosed. However, cooling, coating and chemical treating may also be accomplished by this apparatus. The conditioned atmosphere process apparatus incorporates a forced input directed to an inlet to the processing area. The inlet and a baffle associated with the apparatus act to provide coverable of all sides of the assembled component passing through the controlled atmosphere area. An outlet from the process area is positioned to scavenge the atmosphere for remote disposal. A vacuum means is employed to exhaust the conditioned atmosphere. This vacuum means has a greater flow rate capacity than of the conditioned atmosphere source to prevent excessive escape of the controlled atmosphere from the processing area.

Thus, a mechanism for handling taped products without manual manipulation is disclosed. Accordingly, it is an object of the present invention to provide such a taped products processor. Other and further objects and advantages will appear hereinafter.

BRIEF DESCRIPTION OF THE DRAWINGS

FIG. 7 is a cross-sectional elevation as seen in FIG. 5 with a locking mechanism engaged.

FIG. 8 is a detailed cross-sectional elevation showing the clamping means of the drive mechanism.

FIG. 9 is a detailed front elevation in cross section of a sleeve assembled with a terminal at the control station.

FIG. 10 is a detail similar to that of FIG. 8 with the jaws of the drive mechanism partially closed.

FIG. 15 is a cross-sectional side view of the assembled product.

DETAILED DESCRIPTION OF THE PREFERRED EMBODIMENT

Figure 1:
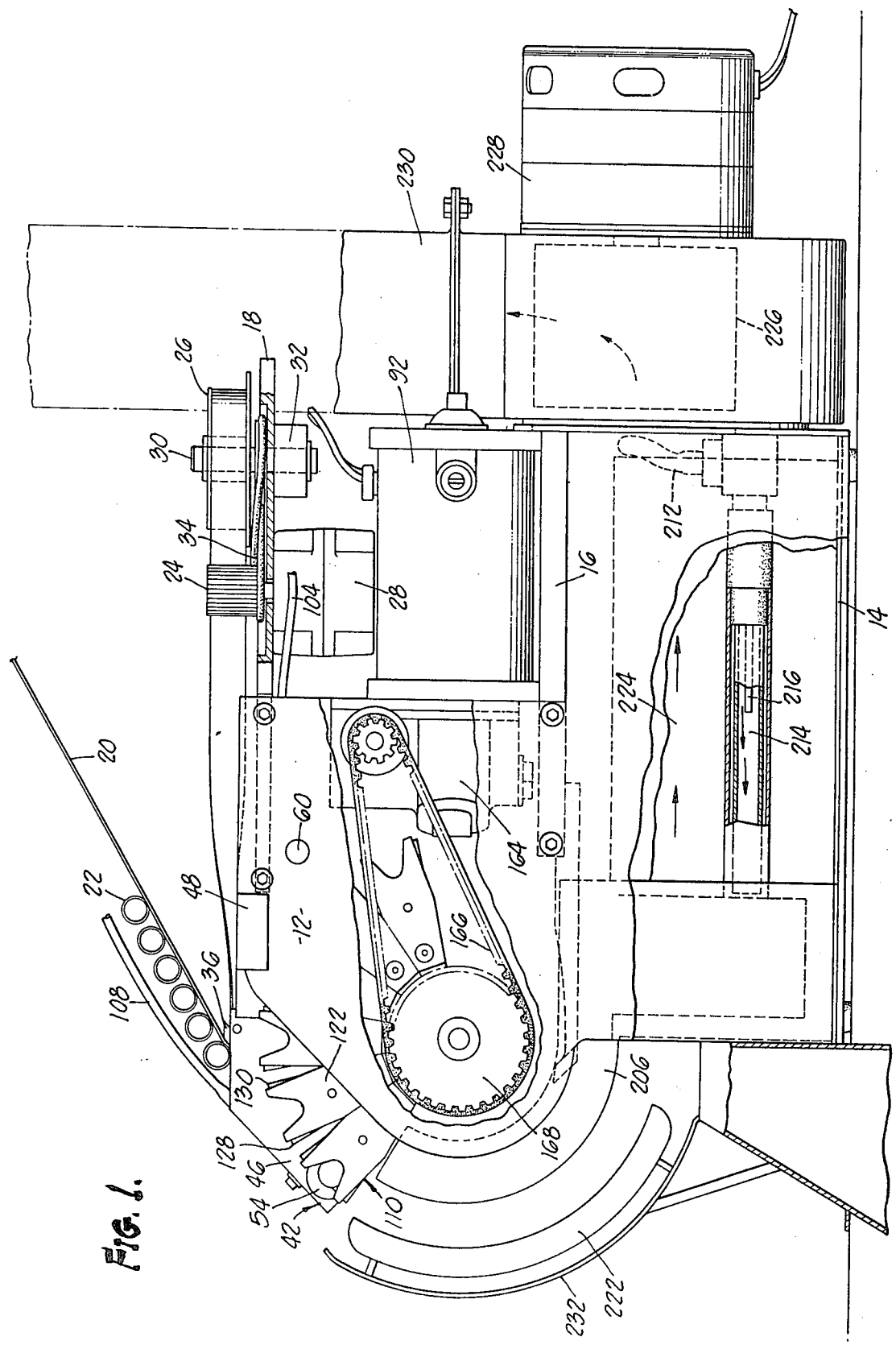
FIG. 1 is a side elevation of the present invention with portions cut away for clarity.
Figure 3:
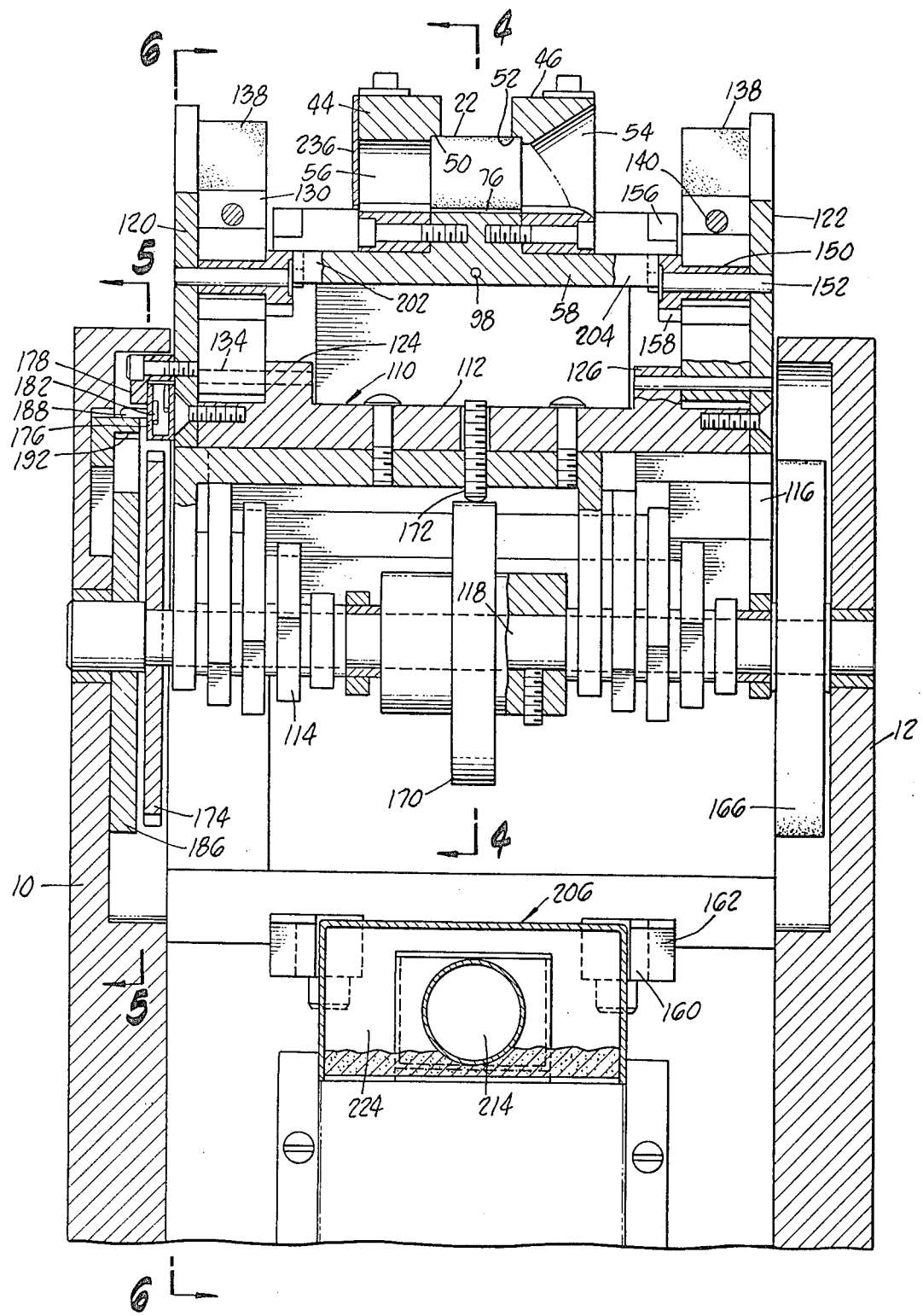
FIG. 3 is a cross-sectional front elevation of the present invention taken along line 3—3 of FIG. 2.

Turning in detail to the drawings, the taped products processor is built on a base comprising two parallel side walls 10 and 12 as shown partially broken away in FIG. 1 and in cross section in FIG. 3. A bottom plate 14 extends across the underside of the apparatus between side walls 10 and 12. A mounting plate 16 also extends between the parallel side walls 10 and 12 as does an upper plate 18.

Looking to the controlled product feed apparatus, a tape 20 to which products or components are adhered is shown being fed into the upper portion of the tape products processor. In the present example, the components are heat recoverable sleeves 22 which are placed by contact adhesive on the tape 20. Naturally, a wide variety of products or components may be fed into the present mechanism as would be obvious to one skilled in the art. The empty tape exiting from the apparatus then passes in tension across a capstan 24 to be wound around a reel 26. The capstan 24 is driven by an electric motor 28 through a direct drive. The motor 28 is fixed to the upper plate 18 with the capstan 24 extending above the upper plate 18.

The reel 26 is rotatably mounted to the upper plate 18 about a shaft 30 which is rotatably held within a bearing 32. The reel 26 is driven by the capstan motor 28 through an elastic belt 34. The capstan motor 28 is controlled as will be more fully set forth below.

Figure 2:
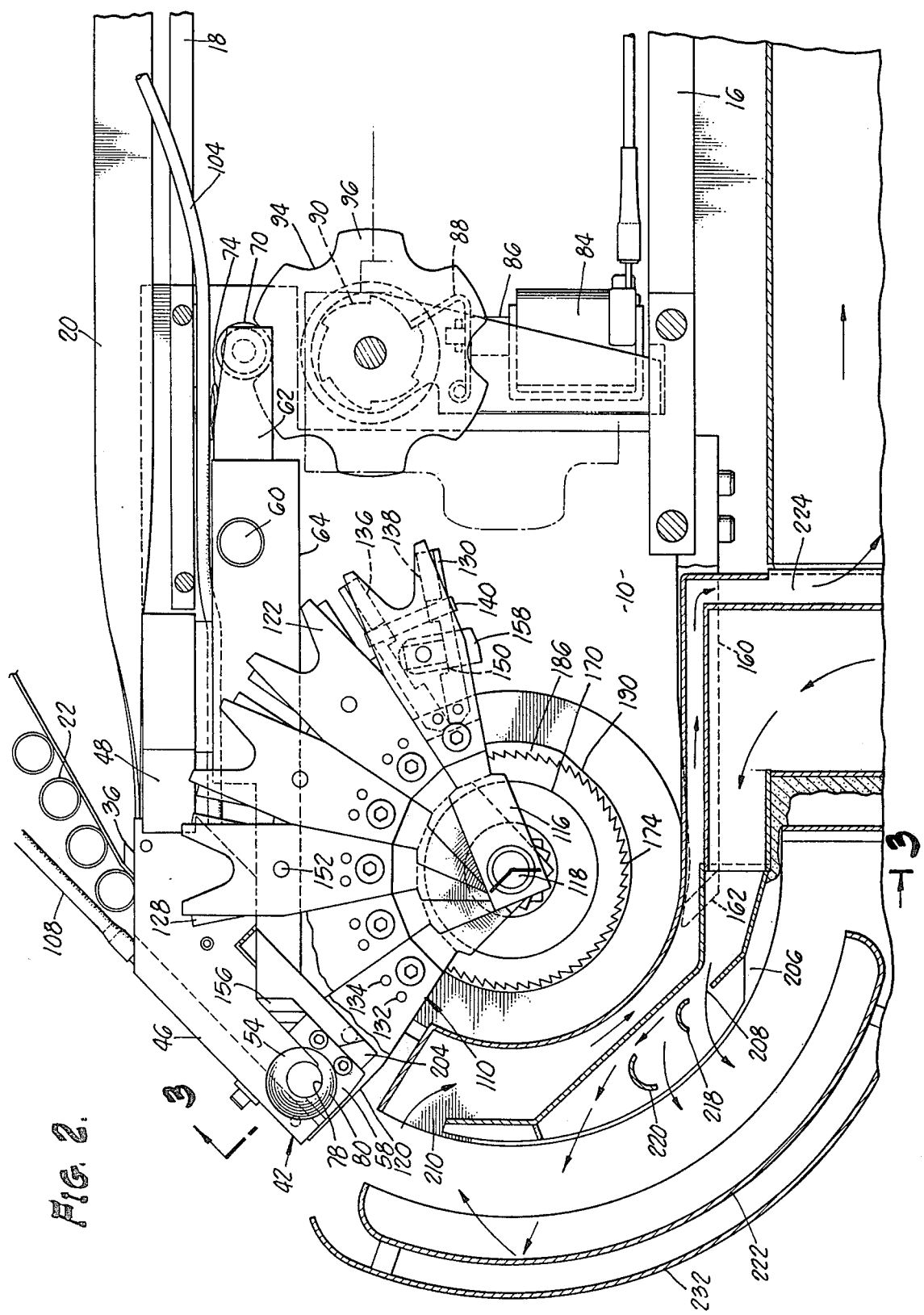
FIG. 2 is a cross-sectional side elevation of the present invention illustrating the drive mechanism and conditioned atmosphere process apparatus.
Figure 4:
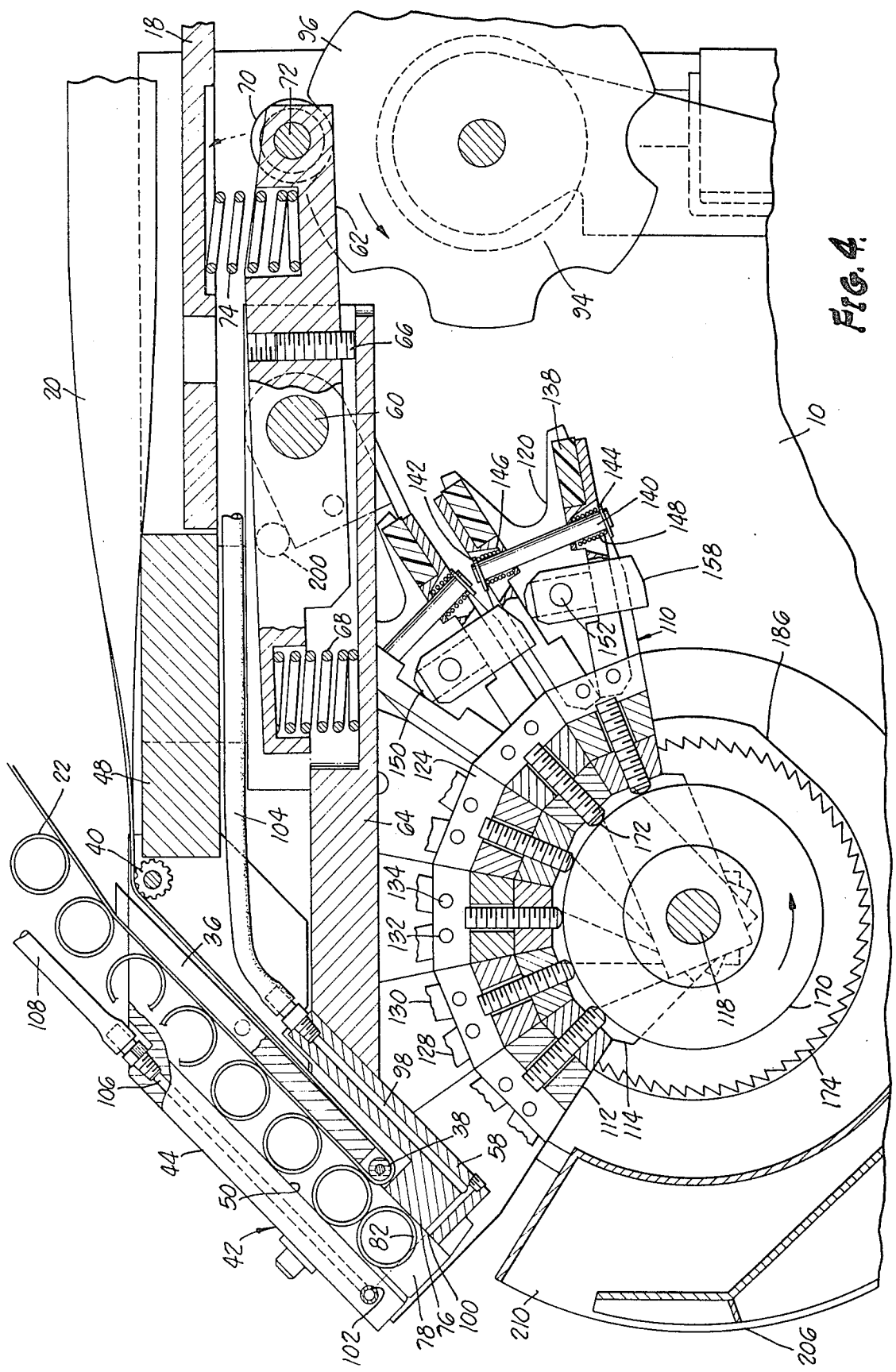
FIG. 4 is a detailed cross-sectional side elevation taken along line 4—4 of FIG. 3.

Turning then to FIG. 4, the path of the tape 20 into the tape products processor is more fully illustrated. The tape 20 extends with the sleeves 22 along a plate 36 to a roller 38. The roller 38 is of a relatively small diameter such that a sharp turn is required of the tape 20. The movement of the tape 20 over the roller 38 causes the sleeve 22 on the tape to become separated therefrom. The tape 20 then extends up the underside of the plate 36 and about a roller 40. It is then twisted and pulled past the capstan 24 as previously discussed. A work path into the tape products processor is defined by the plate 36 and a first member having a passageway therethrough. The first member, generally designated 42, is defined by two parallel guide plates 44 and 46 as can be seen in FIGS. 2, 3 and 4. The guide plates 44 and 46 are held to the base by means of a mounting plate 48. The plate 36 over which the tape 20 passes also extends between the guide plates 44 and 46. Both guide plates 44 and 46 include flanges 50 and 52 extending inwardly toward one another to keep the sleeves 22 in the work path defined therebetween. At one end of the guide plate 46, a tapered channel 54 extends therethrough. A semi-circular channel 56 extends across the guide plate 44 in alignment with the tapered channel 54. The tapered channel 54 and the semi-circular channel 56 in part define the control station wherein the sleeve 22 from the tape 20 is first operated upon.

A second member 58 cooperating with said first member 42 operates to define the remaining portion of the control station. The second member 58 is pivotally mounted for selective separation from said first member 42. A shaft 60 extends across the base between the parallel side walls 10 and 12. A cam follower arm 62 is rotatably mounted to the shaft 60. A carrier arm 64 is also rotatably mounted about the shaft 60 and is associated with the cam follower arm 62 by means of a screw adjustment mechanism including a set screw 66 and a bias spring 68. Thus, the carrier arm 64 is caused to pivot with the cam follower arm 62. In turn the second member 58 is fixed to the carrier arm 64 such that it too rotates about the shaft 60.

At the other end of the cam follower arm 62, a spring 74 extends between the cam follower arm 62 and the upper plate 18 to bias the second member 58 up against the first member 42. To overcome the bias of spring 74, a cam follower 70 is associated with a cam for actuation of the carrier arm. The cam follower 70 is mounted to the cam follower arm 62 by means of a shaft 72. The arrangement of the cam follower arm and carrier arm long with the attendant mechanisms can best be seen in FIG. 4.

Returning to the second member 58, a first portion thereof extends upwardly to a surface substantially in a plane with the plate 36 on which the tape 20 is conveyed. This surface 76 thus defines a continuation of the work path defined by the first member 42 and the plate 36. As the tape 20 is drawn about the roller 38 before the surface 76, the sleeves 22 move on to the surface 76 ahead of the succeeding sleeves.

The second member 58, as can best be seen in FIG. 2 and FIG. 10 further defines the control station by providing an upwardly extending portion forming a stop 78 for the progressing sleeve 22. The stop may be rotated from the path of the sleeve 22 as can best be seen in FIG. 10 through pivotal motion of the second member 58 about the shaft 60. The second member 58 also includes a tapered channel 80 which cooperates with the tapered channel 54 of the first member to define a conical entry way to the control station. A semicircular channel 82 is defined on the other side of the work path by the second member 58 to cooperate with the semicircular channel 56. Thus, sleeves 22 may be fed down the work path on the tape 20 to a position at the control station defined by the first member 42 and the second member 58. The second member 58 may then be pivoted for selective separation such that the sleeve 22 may proceed from the control station. To actuate the pivoting of the second member 58 to separate it from the first member 42, a solenoid 84, as best seen in FIG. 2, is activated electrically by an operator. The solenoid includes a rod 86 which is drawn downwardly upon activation. A pivotally mounted retainer 88 is drawn away from a ratchet wheel 90 by the rod 86. The ratchet 90 is part of a clutch mechanism which is in turn associated with an electric motor 92. The motor 92 is running throughout the operation of the tape products processor and as the ratchet wheel 90 is released, the clutch causes the motor 92 to engage a cam 94. The cam follower 70, discussed above, is controlled by the cam 94. Thus, when the solenoid 84 is activated by an operator of the apparatus, the cam rotates and the second member 58 is caused to pivot away from the first member 42.

The cam 94 has a series of raised teeth-like members 96 which act to pivot the second member 58 from the rest position. Once the solenoid 84 is released, the retainer 88 drops against the ratchet wheel 90 such that only one raised tooth-like member 96 will be experienced during one cycle of operation. As the cam 94 reaches the end of the raised tooth-like member 96, the retainer 88 disengages the clutch through the ratchet wheel 90. At this point, the second member 58 is again positioned adjacent the first member 42 for receipt of a succeeding sleeve 22.

To cause advancement of the tape 20 once the sleeve 22 is released from the control station by the operation of the second member 58, a detection means for sensing the readiness of the control station for another component is employed. This detection means employs a path extending from the first member 42 to the second member 58 across the control station. An interruption in this path can be detected by the sensing system. In this embodiment, a pneumatic sensing system is employed. An air passageway 98 extends through the second member 58 to a nozzle 100. The nozzle 100 is directed at an orifice 102. The distance between the nozzle 100 and the orifice 102 constitutes the sensing path. Compressed air is supplied to the air passageway 98 along tubing 104. This compressed air is released at the nozzle 100 where it is directed to the orifice 102. A second air passageway 106 extends through the guide plate 44. The pressurized air received by the orifice 102 is then directed through tubing 108 to a standard pressure switch (not shown). The pressure switch activates the capstan motor 28 which causes the tape 20 to be advanced.

The sensing path between the nozzle 100 and the orifice 102 is closed only when a sleeve 22 is not positioned in the control station and the second member 58 is closed against the first member 42. The switch is therefore open except when the control station is empty and the second member 58 is closed and ready to receive the next sleeve 22. The sequence of operation following the operator's activation of the solenoid 84 is that the second member 58 is opened to allow removal of the leading sleeve 22. Once the sleeve is removed and the cam 94 comes to rest with the second member 58 again against the first member 42, the sensing path is closed and the capstan motor 28 is activated. When a sleeve 22 again enters the control station because of the movement of the tape 20, the capstan motor 28 is shut off.

The tape products processor of the present invention incorporates a drive which provides both a friction coupling and a positive coupling to work carriers which move each sleeve 22 from the control station through an atmosphere processing zone. Looking first to the work carriers, generally designated 110, six are illustrated in the present embodiment. Each work carrier includes a body 112 from which two legs 114 and 116 extend to a shaft 118. The legs 114 and 116 are rotatably mounted relative to the shaft 118 and hence allow each work carrier to move full circle about the shaft 118. Extending upwardly from the body 112 are two jaw holders 120 and 122. Bars 124 and 126 also extend upwardly to aid the jaw holders 120 and 122, respectively. Jaws 128 and 130 are pivotally mounted on pins 132 and 134 between the jaw holders 120 and 122 and the bars 124 and 126. The jaws 128 and 130 include resilient gripping members 136 and 138. The jaws may be opened as can best be seen in FIG. 4 or closed as can best be seen in FIG. 11. When closed, the gripping members 136 and 138 cooperate to hold an assembled product therebetween.

To limit opening of the jaws and bias the jaws toward a closed position, a pin 140 extends through each jaw 128 and 130 of each work carrier 110. Snap rings 142 and 144 are placed at either end of the pin 140 behind bias springs 146 and 148. The bias springs 146 and 148 extend inwardly from the snap rings 142 and 144 to force against the jaws 128 and 130 to bias the jaws toward a closed position.

Figure 11:
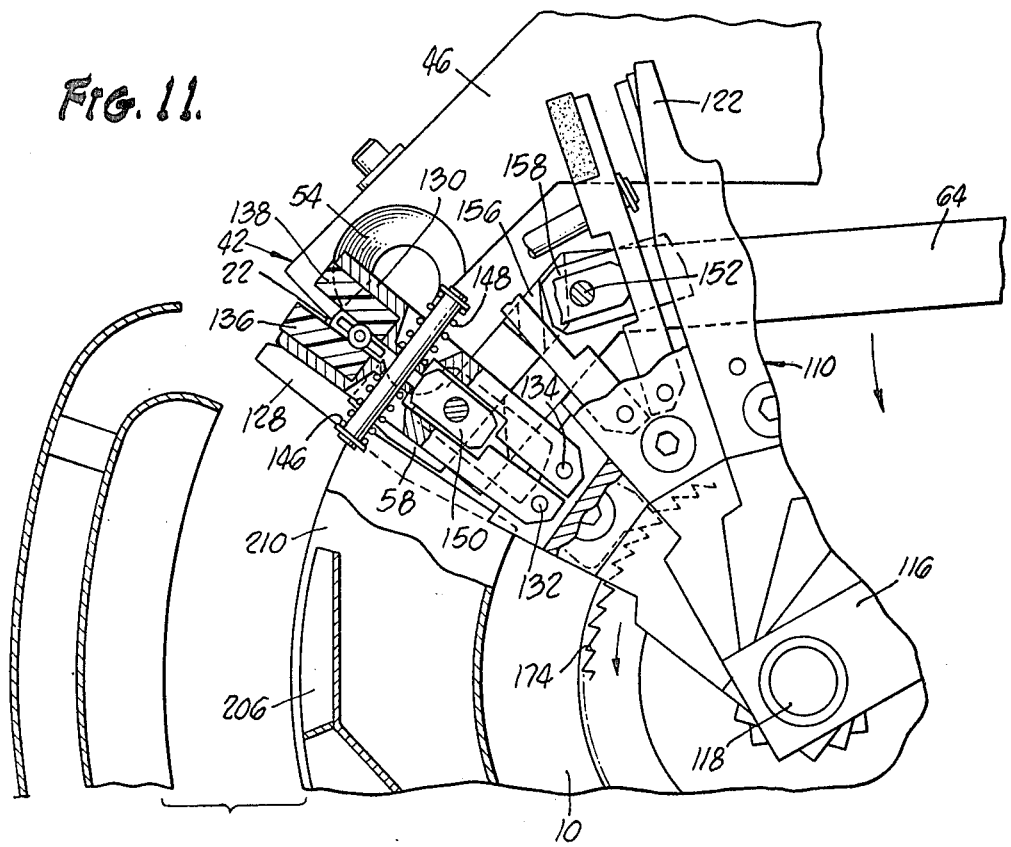
FIG. 11 is a detailed cross-sectional elevation as in FIG. 10 with the jaws further closed.
Figure 12:
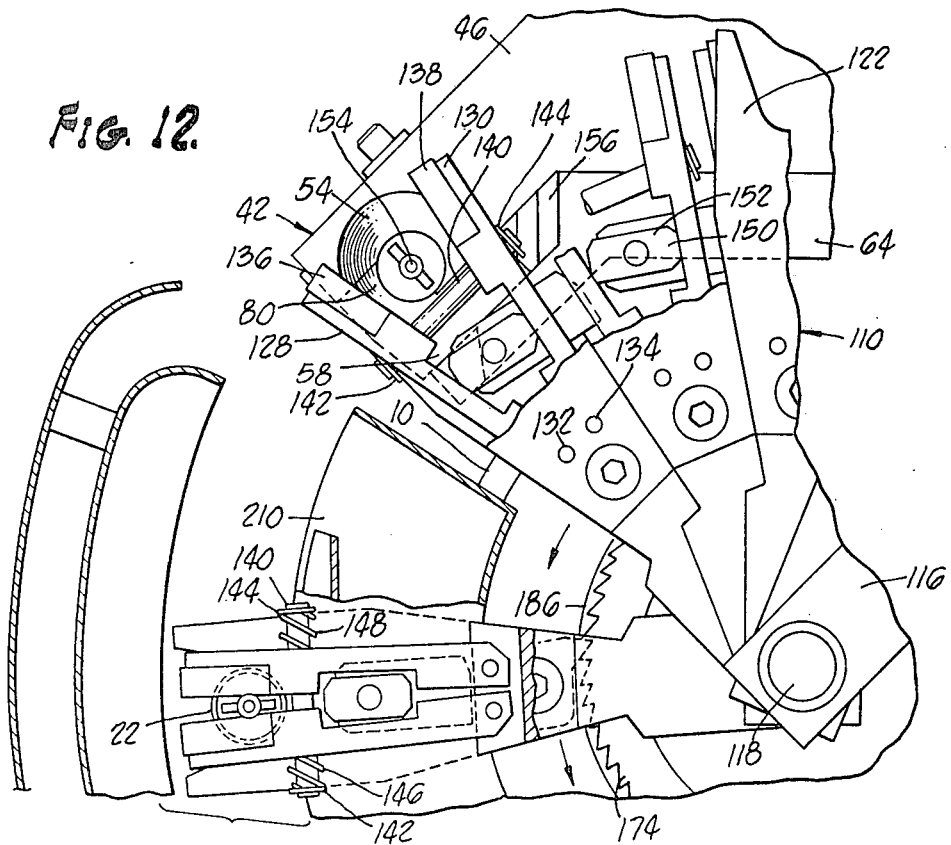
FIG. 12 is a detailed cross-sectional elevation showing the closed jaws passing through the process area.

To open the jaws, a rectangular dog 150 is positioned between the jaws 128 and 130. Each rectangular dog 150 is pivotally mounted to a jaw holder 120 and 122 by means of posts 152. When the rectangular dog 150 is disposed with its narrower dimension extending between the jaws 128 and 130, the laws are closed as can be seen in FIG. 11. When the rectangular dog 150 is disposed with its longer dimension extending between the jaws 128 and 130, the jaws are held open.

To actuate the rectangular dogs 150, cam means are provided at specific points around the path of the work carriers 110 for selectively opening and closing the jaws. As each work carrier 110 approaches the control station, the jaws are in an open position. This position is best seen in FIG. 8. It is also advantageous to close the jaws at the control station when a conductor 154 is positioned therein, as can best be seen in FIG. 9. Therefore, laterally extending lugs 156 are provided on the side of the second member 58. A follower 158 is provided with each rectangular dog 150 and is fixed to rotate therewith such that the laterally extending lugs 156 may engage the follower 158 to rotate the rectangular dogs 150 into the closed jaw position. When the leading work carrier 110 is positioned at the control station, pivoting of the second member 58 will cause such an interference between the lugs 156 and the follower 158. This action can best be seen sequentially in FIGS. 10 and 11. Therefore, as the second member 58 is moved downwardly, the jaws 128 and 130 close on the conductor 154. At the same time, the sleeve 22 is released so that the work carrier 110 make carry the assembled product from the control station.

Figure 13:
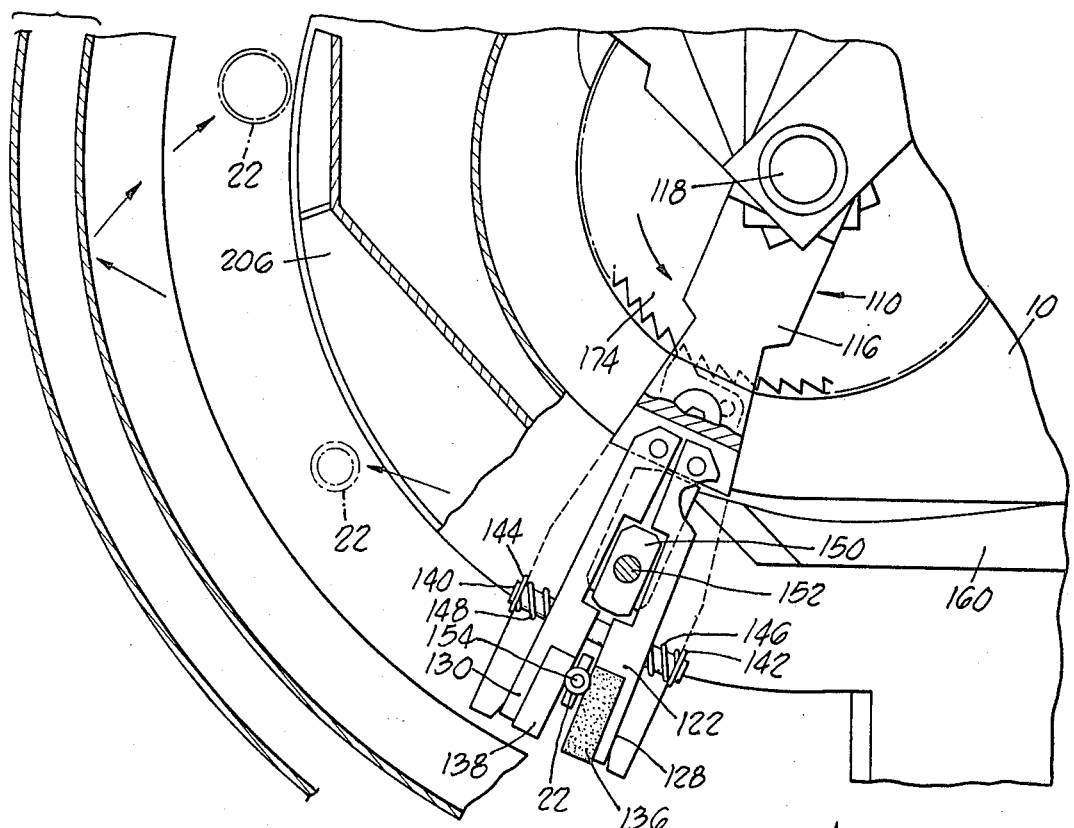
FIG. 13 is a cross-sectional elevation showing the jaws exiting from the process area.
Figure 14:
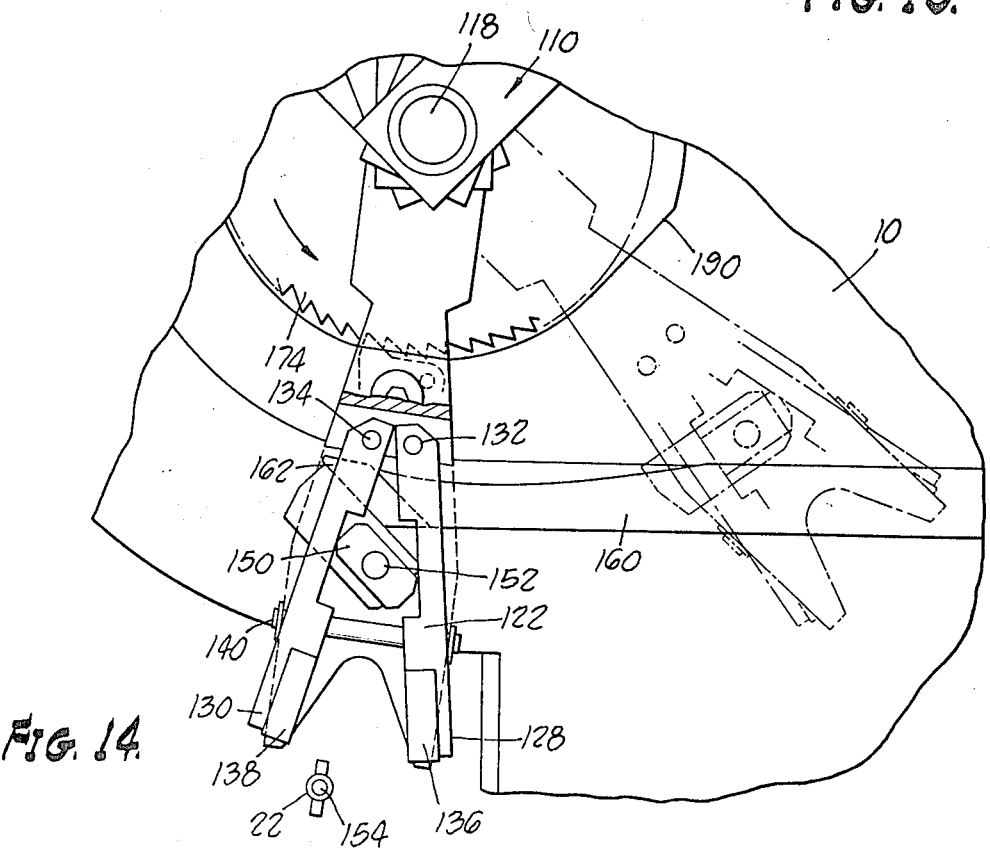
FIG. 14 is a detailed cross-sectional side elevation of the jaws being released.

To again open the jaws 128 and 130, another cam means is provided at the most convenient release point for the assembled product. An arm 160 extends outwardly to the preselected release point for engagement with the follower 158. The arm 160 includes an outwardly extending bar 162 for interception of the follower 158. As can be seen in FIGS. 13 and 14, the bar 162 engages and rotates the follower 158 which in turn rotates the rectangular dogs 150 to open the jaws 128 and 130. As can be seen in FIG. 14, the opening of the jaws 128 and 130 allows the completed product to drop from the mechanism.

To drive the work carriers 110, a drive is provided. The drive power is directed from the motor 92 through a gear box 164 to a tooth belt drive 166. The tooth belt drive 166 drives the shaft 118 through gear wheel 168. The shaft 118 extends between the parallel side walls 10 and 12 of the base and is rotatably mounted therein. The gear wheel 168 is fixed to rotate with the shaft to provide power thereto. Also fixed on the shaft is a wheel 170 having a friction drive peripheral surface, i.e., the peripheral surface of the wheel 170 is substantially circular without major discontinuities. The work carriers 110 each are capable of being driven by the wheel 170 through a friction follower 172 extending to the wheel 170. Each friction follower 172 engages the wheel 170 and the corresponding work carrier 110 is caused to rotate therewith if no substantial obstructions are encountered. If passage of the work carrier 110 is obstructed, the friction follower 172 will slip on the wheel 170 unless otherwise driven.

Figure 6:
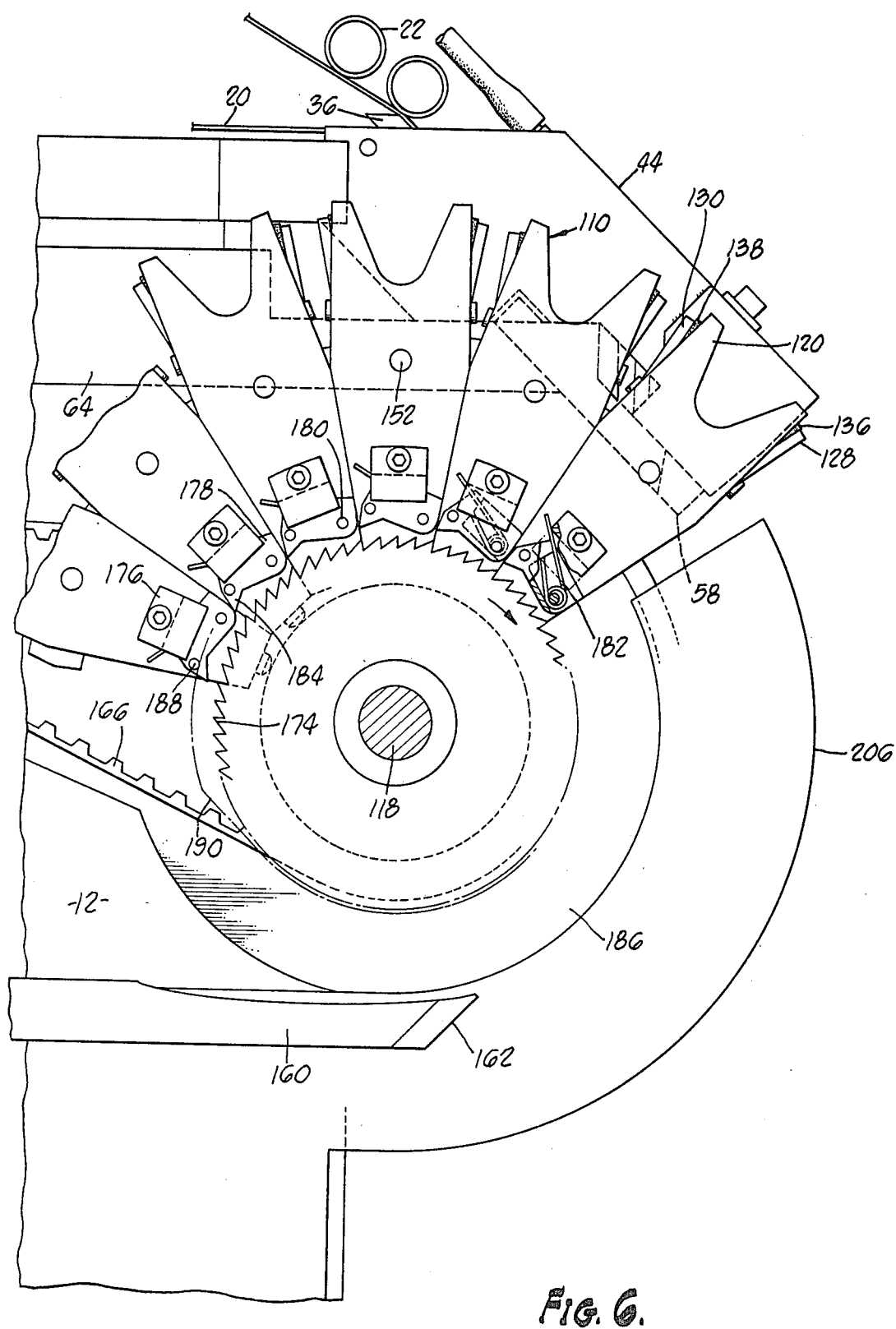
FIG. 6 is a detailed cross-sectional side elevation taken along line 6—6 of FIG. 3.

To provide a positive drive to the work carriers 110, a second wheel 174 fixed to the shaft 118 is provided which has a positive drive peripheral surface. In the present embodiment, the wheel 174 includes a ratchet peripheral surface. To engage the ratchet wheel 174, a pivotally mounted pawl 176 is provided on the jaw holder 120. A bracket 178, as best seen in FIG. 6, retains the pawl 176 in place about its pivotal mount 180. A spring 182 is also positioned about the pivotal mount 180 to bias the pawl 176 away from the bracket 178. The pawl naturally includes a tooth 184 for engaging the ratchet wheel 174.

As positive engagement of the work carriers by the drive mechanism is undesirable in certain portions of the path of the travel of the work carriers, a selective engagement mechanism is employed to retain the pawls 176 away from the ratchet wheel 174. This mechanism includes a cam 186 which cooperates with followers 188 located on each of the pawls 176. As can be seen in FIG. 6, the cam 186 has retracted the pawls 176 from the ratchet wheel 174. Around the remainder of the path of travel, up to the inclined cam surface 190, the pawls 176 are engaged with the ratchet wheel 174.

Figure 5:
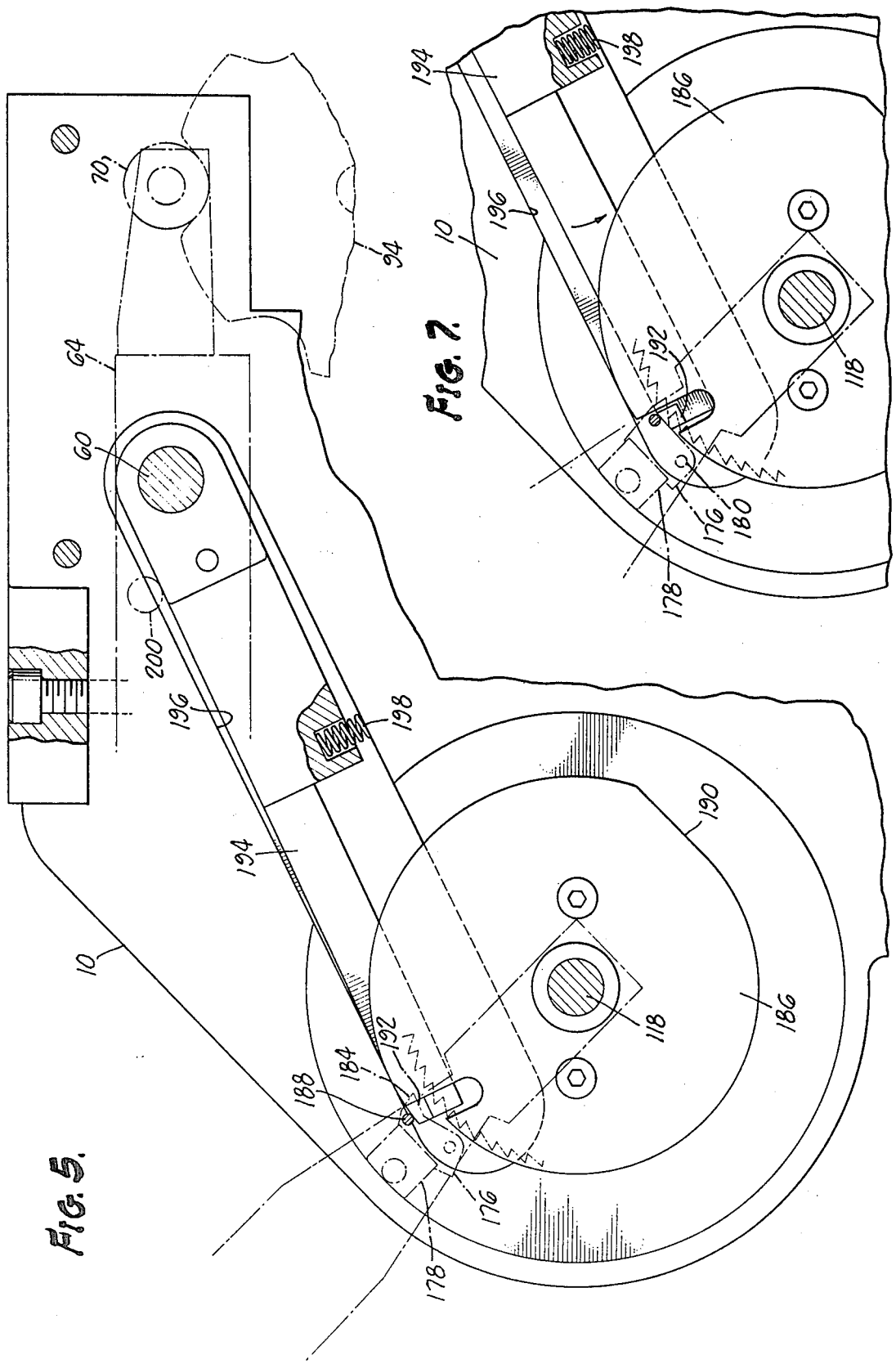
FIG. 5 is a detailed cross-sectional side elevation taken along line 5—5 of FIG. 3.

The transition from positive drive to friction drive at the inclined cam surface 190 is in an area where the specific location of the work carriers 110 is not critical. However, the transition from the friction drive to the positive drive at the control station is relatively more important. Substantial torque may be required to drive the work carrier 110 from the control station with the assembled product. Consequently, a retractable cam segment 192, as best seen in FIG. 5 and FIG. 7, is provided to release the pawl 176 such that it may engage the rotating ratchet wheel 174. In this way, transition from friction drive to positive drive is immediate where needed. The retractable cam segment 192 is positioned on an extended arm 194 which is pivotally mounted about the shaft 60. The extended arm 194 is positioned within a milled out cavity 196 in the side wall 10. A spring 198 biases the extended arm 194 and in turn the retractable cam segment 192 in the up position. When the carrier arm 64 is actuated by the cam 94, a pin 200 engages the extended arm 194. This engagement of the pin 200 with the extended arm 194 is adjusted such that the pawl 176 will not engage the ratchet wheel 174 until the second member 58 is substantially open for passage of a sleeve 22 from the control station.

To follow the sequence of the drive through one revolution of the work carrier 110, positive drive is provided as the retractable cam segment 192 is lowered. The work carrier 110 then progresses under positive drive through the process area at a predetermined fixed speed. This speed is insured because of the positive operation of the drive. The positive drive also carries the work carrier 110 across the bar 162 which again opens the jaws 128 and 130. Once having passed the bar 162, the positive drive is disengaged by means of the cam 186 at the inclined cam surface 190. The friction drive continues until the work carrier 110 abuts against the next adjacent work carrier. The several work carriers 110 then advance as each one is loaded and released by the second member 58. Thus, the friction drive conceys each work carrier 110 up to the control station. To prevent the friction drive from conveying each work carrier 110 past the control station, small stops 202 and 204 are provided on the second member 58. These stops 202 and 204 interfere with the path of travel of the posts 152 associated with each work carrier 110. This interference by the stops 202 and 204 can be best seen in FIG. 3. When the second member 58 is lowered, the stops 202 and 204 move from the path of the work carrier 110 simultaneously, the positive drive is engaged and the work carrier 110 proceeds on a second cycle.

A processing zone is disposed in the path of travel of the work carriers 110 following the control station. The processing zone provides a conditioned atmosphere for processing of the assembled products. In the present embodiment, a heater is provided to heat recover the sleeves 22 about the conductor 154 and the terminals shown to be positioned thereon. Thus, the conditioned atmosphere disclosed in the present embodiment is one of heat. However, other atmospheres for cooling, coating, and chemically treating assembled products may also be employed.

The conditioned atmosphere processing apparatus includes a manifold, generally designated 206. The manifold has a first inlet 208 to the processing zone and a first outlet 210. Compressed air is delivered to the manifold through tubing 212. The compressed air then passes through a first passageway 214 in route to the first inlet 208. The first passageway 214 includes, in the present embodiment, a heating element 216 to heat the incoming compressed air. At the first inlet 208 to the treatment zone, to vanes 218 and 220 are positioned to direct flow directly outwardly from the manifold 206. A portion of the air is also directed upwardly. In this way, a sleeve passing through the processing zone will experience impinging hot air on its entire surface. To aid in properly processing the assembly passing through the processing zone, a concaved baffle 222 is positioned at a distance from the manifold 206. Between the baffle 222 and the manifold 206 a product path is defined which is followed by the work carriers 110. The baffle 222 rebounds heated air to further help to heat the far side of the sleeves passing along the product path. The outlet 210 from the processing zone is located above and spaced from the inlet 208. The air coming from the inlet 208 therefore has a chance to heat the sleeve passing therethrough and and then pass through the outlet 210 back into the manifold. The outlet extends to a second passageway 224 surrounding the first passageway 214 to an exhaust fan 226. The exhaust fan 226 is driven by an electric motor 228 which has a flow rate capacity that is greater than the flow rate capacity of the incoming air. Therefore, the exhaust fan 226 is able to draw both the conditioned atmosphere and ambient air from around the baffle 222 into the outlet 210. The exhausted air is then carried away through duct 230.

To protect the operator from a burn, a shield 232 is provided around the baffle 222 and spaced therefrom. Thus, accidental burns are less likely.

Thus, the entire system, apparatus and operation of the taped products processor has been set forth. To summarize the operation, products 22 positioned on a tape 20 are fed individually to a control station. Feeding is by means of a capstan 24 which pulls the tape 20 from the unit. The capstan 24 is activated by an air sensing system at the control station. A drive having both positive and friction couplings is provided to convey the assembled products through a conditioned atmosphere processing zone where the assembled product is heated or otherwise processed from all sides. The entire operation is activated by means of an input to a solenoid which causes the second member 58 forming the control station to drop and release the assembled product. In the present embodiment, a heat recoverable sleeve 22 is employed and a conductor having a terminal 234 is positioned through the sleeve. The conductor 154 is clamped by the jaws 128 and 130. To prevent overplacement of the conductor 154, a plate 236 is fixed to side wall 10. Once clamped, the assembled product is conveyed through the heating step where the heat is recovered to a final state such as shown in FIG. 15.

While embodiments and applications of this invention have been shown and described, it would be apparent to those skilled in the art that many more modifications are possible without departing from the inventive concepts herein described. The invention, therefore, is not to be restricted except by the spirit of the appended claims.

What is claimed is:

1. A controlled product feed apparatus comprising
a first member and second member defining a control station wherein work may be positioned, said second member including a stop to hold the work in said control station and being pivotally mounted for selective separation from said first member to allow the work to pass from said control station;
feed means including a work feed path extending to said control station and means for advancing work along said feed means to said control station; and
detection means for sensing an interrupted path extending from said first member to said second member across said control station such that work in said control station will interrupt said path and said separation of said second member from said first member will interrupt said path, said detection means being associated with means for advancing work to activate said means for advancing work when said path is uninterrupted, said detection means for sensing an interrupted path including a nozzle, a source of pressurized air, an orifice, and a pressure activated switch, said nozzle is in one of said first and second members and said orifice is in the other of said first and second members.

2. The controlled product feed apparatus of claim 1 wherein said means for advancing work along said feed means is activated by said pressure switch.

* * * * *